(12) United States Patent
Sellers et al.

(10) Patent No.: US 7,512,892 B2
(45) Date of Patent: Mar. 31, 2009

(54) METHOD AND SYSTEM FOR DISPLAYING AND INTERACTING WITH PAGINATED CONTENT

(75) Inventors: Timothy D. Sellers, Bellevue, WA (US); Heather L. Grantham, Redmond, WA (US); Joshua A. Dersch, Redmond, WA (US); Jeremy W. J. Newton-Smith, Seattle, WA (US); Nicholas Gregg Brown, Seattle, WA (US); Annette Kay Leedy, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 232 days.

(21) Appl. No.: 11/073,140

(22) Filed: Mar. 4, 2005

(65) Prior Publication Data

US 2006/0200760 A1 Sep. 7, 2006

(51) Int. Cl.
*G06F 15/00* (2006.01)
*G06F 17/00* (2006.01)

(52) U.S. Cl. .................. 715/764; 715/781; 715/784; 715/786; 715/787; 715/273

(58) Field of Classification Search .............. 715/500, 715/526, 517, 764, 781, 784, 786, 787
See application file for complete search history.

(56) References Cited

U.S. PATENT DOCUMENTS

| | | | |
|---|---|---|---|
| 5,818,447 A * | 10/1998 | Wolf et al. .................. 715/752 |
| 6,332,212 B1 * | 12/2001 | Organ et al. ................. 717/128 |
| 2003/0097640 A1 * | 5/2003 | Abrams et al. .............. 715/530 |
| 2004/0163042 A1 * | 8/2004 | Altman ........................ 715/512 |
| 2004/0205663 A1 * | 10/2004 | Mohamed .................... 715/530 |
| 2004/0230636 A1 | 11/2004 | Masuoka et al. |
| 2004/0230900 A1 * | 11/2004 | Relyea et al. ............... 715/513 |
| 2004/0239700 A1 | 12/2004 | Baschy |
| 2005/0022211 A1 * | 1/2005 | Veselov et al. .............. 719/318 |
| 2005/0091576 A1 | 4/2005 | Relyea et al. |
| 2005/0240618 A1 * | 10/2005 | Nickerson et al. ........... 707/102 |

OTHER PUBLICATIONS

Alspach, Jennifer; Adobe Acrobat 7 for Windows and Macintosh: Visual QuickStart Guide; Publisher: Peachpit Press; Pub Date: Jan. 6, 2005; pp. 1-18.*

* cited by examiner

*Primary Examiner*—Doug Hutton
*Assistant Examiner*—Nathan Hillery
(74) *Attorney, Agent, or Firm*—Workman Nydegger

(57) ABSTRACT

A document viewer control that is hosted by another computer program to provide that program with document viewing functionality, including enabling user interaction with the content. An interface provides the program with plug-in access to document viewing functionality, including scrolling, zooming, finding, layout, copying and the like. Properties may be retrieved and set via the interface, and commands may be issued. The result is that any program can provide document viewing functionality in a consistent manner. Moreover, via styles or the like, a program developer can deactivate and/or override default functionality, to customize and/or extend the document viewer as desired for a given program.

20 Claims, 5 Drawing Sheets

METHOD AND SYSTEM FOR DISPLAYING AND INTERACTING WITH PAGINATED CONTENT

FIELD OF THE INVENTION

The invention relates generally to computers, and more particularly to displaying content on a computer system.

BACKGROUND

One of the most common uses of computer systems is to display the content of documents. Contemporary computer systems and programs provide great flexibility in viewing a document, including jumping to hyperlinked locations in the document, zooming in and out of the content, allowing a user to jump to a desired page by indicating a desired page number, scroll and use keyboard keys to navigate the document, and perform many other document viewing options.

However, application program developers that want to display paginated content typically write code to provide their own document viewing functionality. In part this is because there was heretofore generally no other way for developers to provide such viewing functionality, but also because there are different types of application programs and content, and application developers want to provide features that make sense for their particular program and the types of content to be displayed.

At the same time, a lot of the functionality and features that content-viewing code provides is common among programs. For example, zooming, scrolling, text searching and so forth can be found in browsers, word processors, document readers, and other programs. Separately coding these features into every application is highly inefficient, and is generally less robust in that there is a lot of custom code, and thus likely more bugs. Moreover, this leads to inconsistency in that various applications each provide their own way to view content. As a result, users have to learn many different types of programs and their user interfaces simply to see content; sometimes what looks to the user as the same feature as that offered by another program actually behaves quite differently. Similarly, key combinations and/or function keys often have different meanings from one program to the next.

What is needed is a way for programs to include common document viewing functionality and features so that the functionality and features are consistent and robust across programs. At the same time, any such solution should be extensible so that developers can add some level of customization to modify how document viewing operates in a given program, as desired.

SUMMARY

Briefly, the present invention provides a method and system in which a document viewer is provided in a control, with an application programming interface and methods that enables hosting programs to include the document viewer's functionality and extend it. The document viewer control is responsible for page layout, navigation and managing general user interaction with any appropriately formatted content. Functions include printing, keyword find, proportional zooming, multi-pass layout of content flow and/or navigation of content. A hosting program may selectively deactivate any of those features that are not desired, may activate features that are available but not active by default, and may also augment the document viewer control with additional features.

A host program uses the document viewing control to display content in its viewing area. One document viewing control provides a default user interface, generally comprising a toolbar area at the top and a content viewing area (a viewport) below it. In the toolbar area, the document viewing control may display user interface elements, such as one or more buttons and other interactive items for managing the way the document is viewed. Scrollbars are also provided. By default, common document interaction functions are provided as commands activated via the toolbar or a menu, to scroll and zoom, find (search text), and copy. Print may be provided. The hosting program can selectively use less than all of the default document viewer features, and/or activate features and functionality that are not enabled by default. One example toolbar area provides a menu button, a zoom-in button, a zoom combobox, a zoom-out button, a copy button, and a find button.

In one exemplary implementation, the document viewing control exposes several properties and commands via public methods. The document viewing control may contain other controls to perform the document viewing functionality, e.g., a scroll control to handle scrolling behavior, a zoom control to handle zooming, a find control to search text content for matching text, a layout control to lay out a grid of pages for the user to navigate, and a menu control to handle menu-related functionality.

Properties that can be returned to the program may include content-related data, page count data, first visible page data, last visible page data, horizontal offset data, vertical offset data, extent width data, extent height data, viewport width data, viewport height data, data indicative of whether page borders are shown, zoom percentage data, grid column count data, vertical page spacing data, horizontal page spacing data, data indicative of whether at document start, data indicative of whether at document end, data indicative of whether the document can be zoomed in, data indicative of whether the document can be zoomed out, and data indicative of a toolbar state. Properties that can be set by the program may include content-related data, first visible page data, horizontal offset data, vertical offset data, show page borders data, zoom percentage data, grid column count data, vertical page spacing data, horizontal page spacing data and data to change a toolbar state. Commands include a toggle toolbar command, a fit to grid column count command, a reflow document command, a view thumbnails command, a view fit to width command, and a view fit to height command.

The document viewing control may be automatically provided by default as the document viewer whenever one is needed to display content. A program may override the default document viewing control with its own customized document viewing control. The document view control may be styled, so that the document viewer's characteristics need only be specified once to make document viewer appear as desired. An application program can simply describe what features it wants via a style, and a document viewer with that style appears as specified. Styles may be named, whereby a program may define different styles of document viewers, and then vary which style is used at appropriate times during program execution.

Other aspects may become apparent from the following detailed description when taken in conjunction with the drawings, in which:

DETAILED DESCRIPTION

Exemplary Operating Environment

Figure 1:
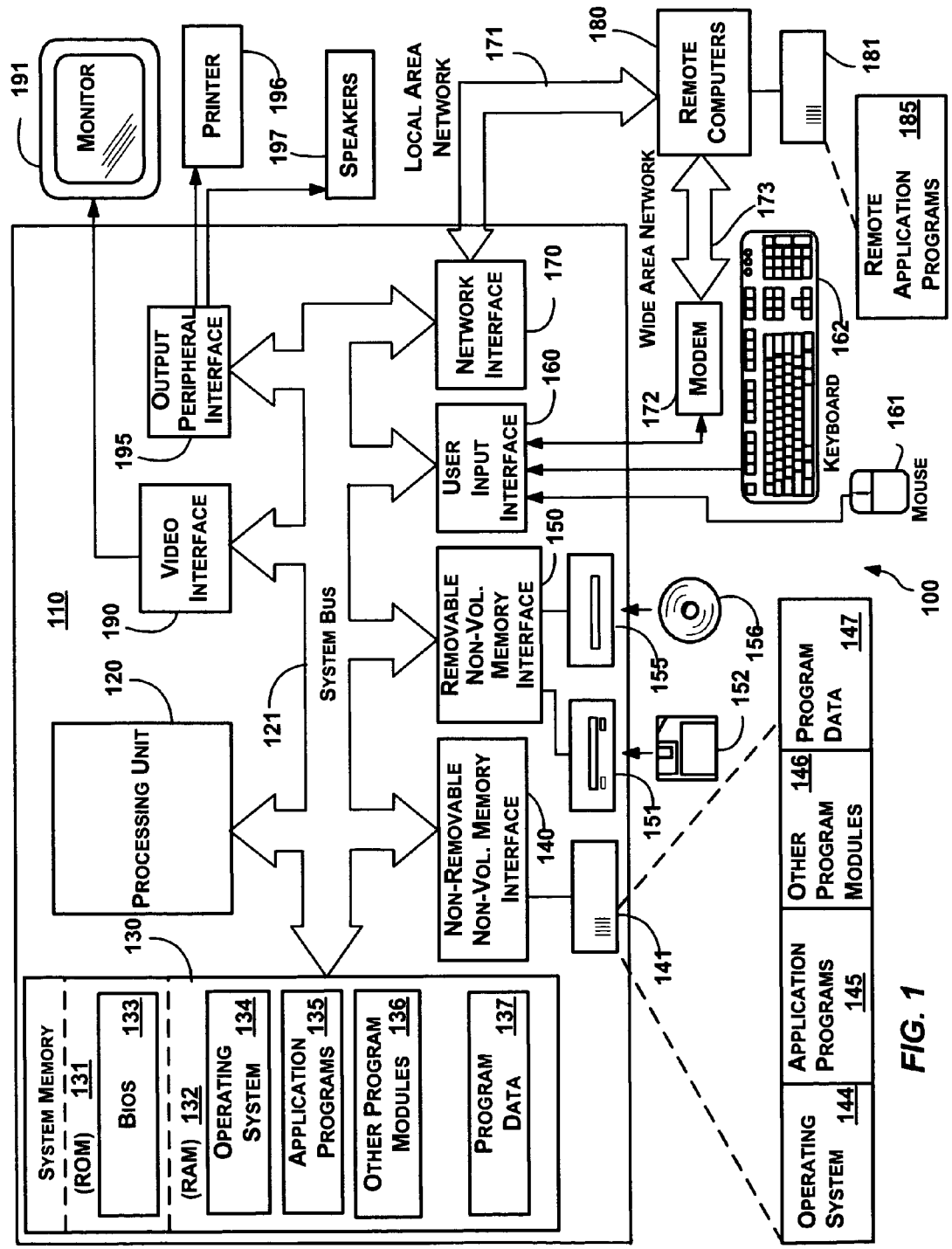
FIG. 1 is a block diagram representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It may be appreciated that the network connections shown are exemplary and other means of establishing a communications link between the computers may be used.

Paginated Content Display and Interaction

The present invention is generally directed towards a document viewer, provided as a control, which is essentially an object that can be hosted by another program to provide that program with certain functionality. The document viewer control provides an interactive viewing solution that is responsible for page layout, navigation and managing general user interaction with any appropriately formatted content. For example, in one implementation, the document viewer control allows viewing of any content that implements an iDocumentPaginator interface, as well as for custom solutions that implement the document viewer control.

In accordance with various aspects of the present invention, as an object, the document viewer control may be added to any suitably configured application program. Programs may invoke the document viewer control automatically or explicitly, e.g., through markup. Once added, the document viewer provides a core set of features, including mixed format (for size and/or fixed content and/or reflowable content that adjusts, e.g., text wraps, based on the space available) layout using a page grid, printing, keyword find, proportional zooming, multi-pass layout of content flow and/or navigation of content. A hosting program may selectively deactivate any of those features that are not desired, may activate features that are available but not active by default, and may also augment the document viewer control with additional features.

As will be understood, numerous ways to implement the present invention are feasible, and only some of the alternatives are described herein. For example, the present invention is primarily described below with reference to a composite control object model, in which the document viewing control contains other control objects to provide some of its functionality. However, this is not necessary to the present invention, and other models, such as one in which the document viewer directly includes the viewing functionality, features and logic without containing other objects, are feasible. As such, the present invention is not limited to any particular examples or implementations described herein, but rather may be used various ways that provide benefits and advantages in computing in general.

Figure 2:
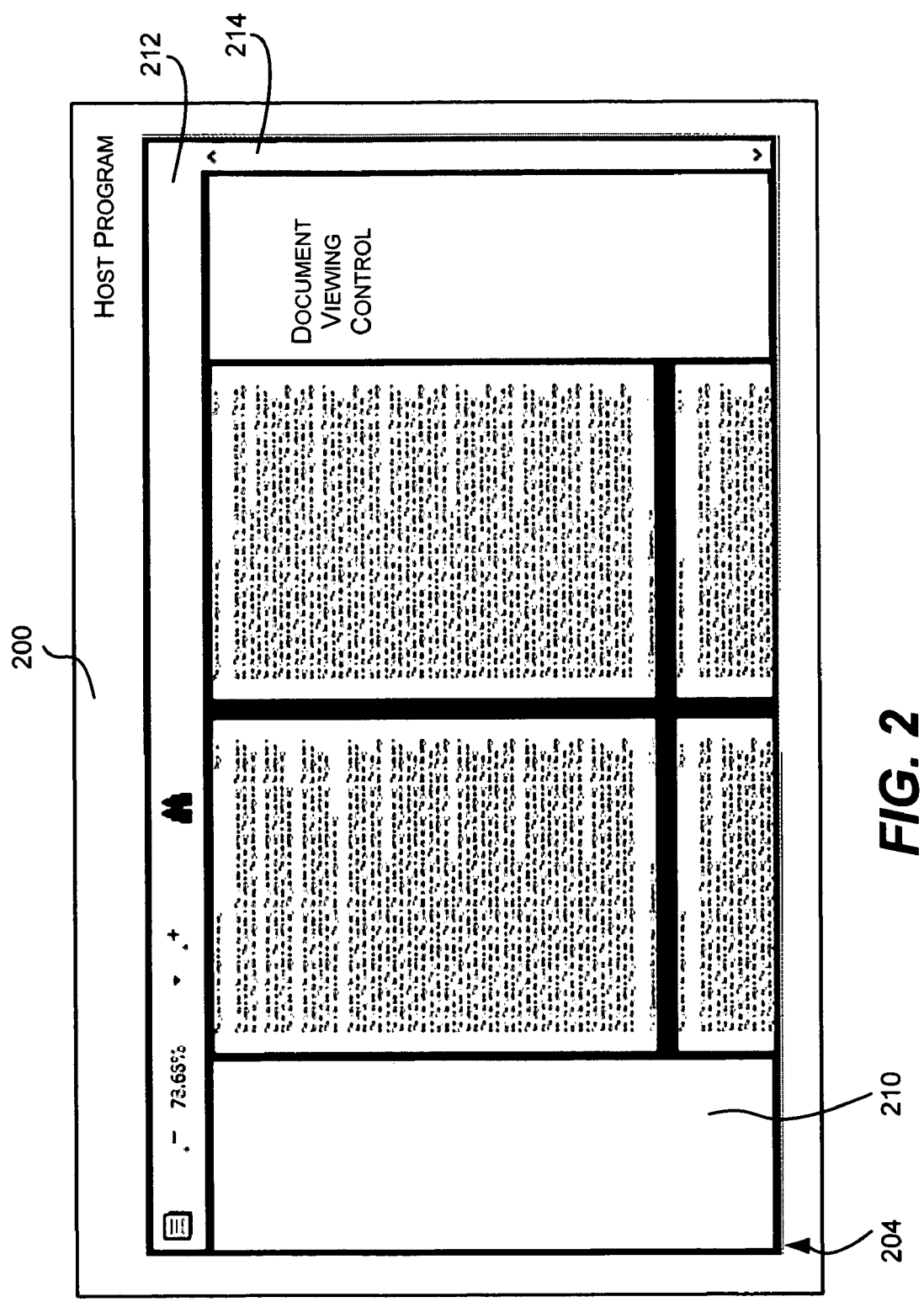
FIG. 2 is a representation of an exemplary configuration in which a document viewing control may be hosted by a program, in accordance with various aspects of the invention.

Turning to FIG. 2, there is shown a block diagram representing an exemplary configuration in which the present invention may operate in accordance with various aspects of the present invention. The configuration includes a host (e.g., application) program 200 and a document viewing control 204 that displays content in its viewing area, referred to as a viewport 210, wherein as used herein, a document includes essentially any type of visible content, and thus may include text, graphics, animated text and/or graphics, and video, or any combination thereof. The host program 200 comprises a computer program that executes on a computer system, such as the computer system 100 of FIG. 1, and may be a conventional application program, an operating system component or utility, another control, and so forth.

The document viewing control 204, named Document-Viewer in one implementation, provides a default user interface, generally comprising a toolbar area 212 at the top and a content viewing area (the viewport 210) below it. In the toolbar area 212, the document viewing control 204 may display user interface elements, such as one or more buttons and other interactive items for managing the way the document is viewed. Also shown in the example document viewer screenshot of FIG. 2 is the scrollbar user interface element 214 that allows the user to scroll the content within the viewport 210.

In one example implementation, the document viewing control 204 provides a number of common document interaction functions by default, e.g., to navigate, find (search text), copy, and zoom. Print is another example of a user interaction function that may be provided by default. In keeping with various aspects of the present invention, application programs can simply "plug in" the control to have its default functionality, as described below. The hosting program 200 can selectively use less than all of the default document viewer features, e.g., by removing, hiding, disabling and/or overriding defaults. The program 200 also may activate features and functionality that are not enabled by default.

Figure 3:
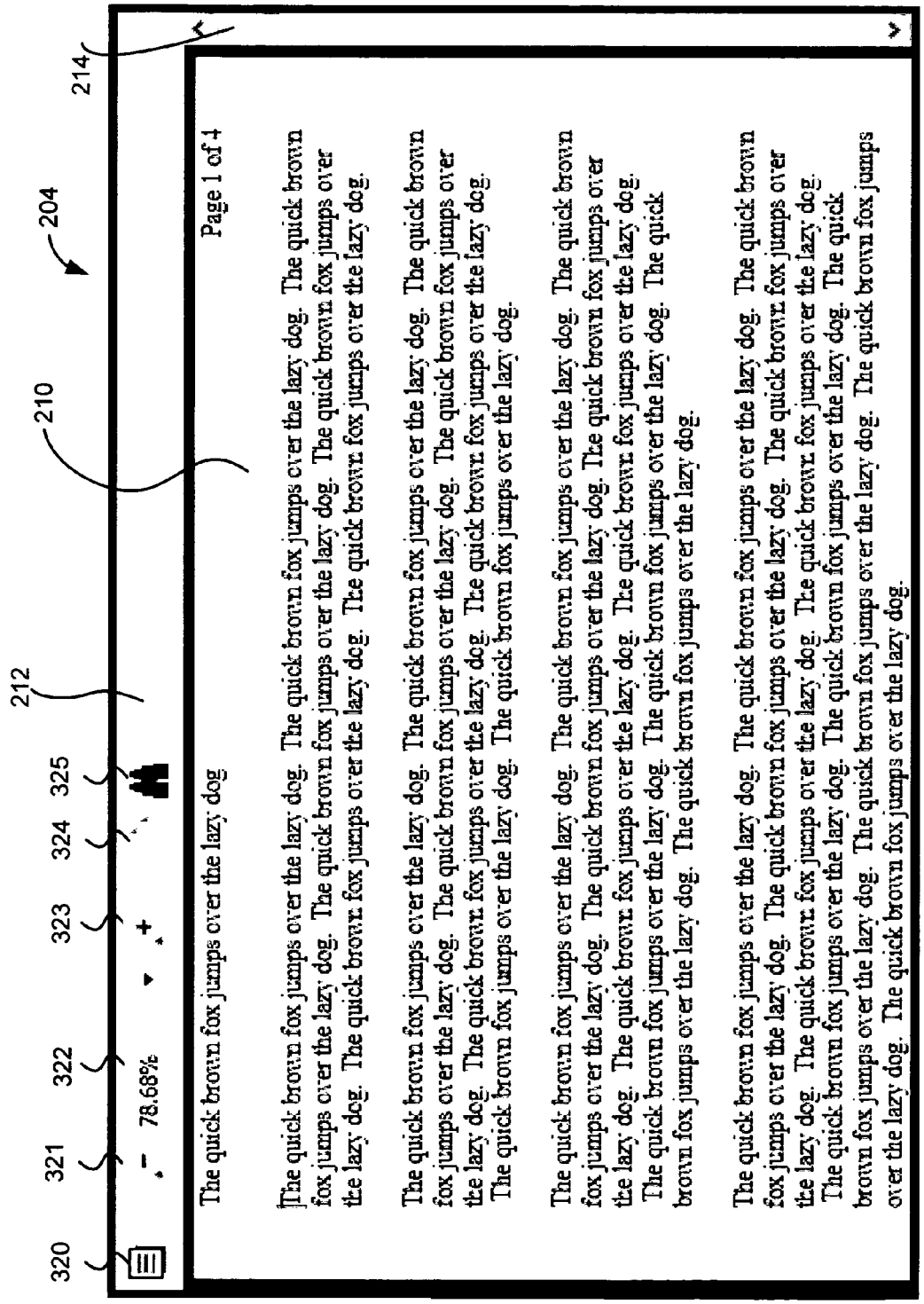
FIG. 3 is an exemplary screenshot representation showing user interface elements for use in interacting with the document viewing control, in accordance with various aspects of the invention.

By way of example of some default features, FIG. 3 is a screenshot illustrating one exemplary view of a document viewing control 204 in operation in accordance with various aspects of the invention. In this representation, the toolbar area 212 of the document viewing control 204 includes toolbar items 321-325, including a menu button 320, a zoom-in button 321, a zoom combobox 322, a zoom-out button 323, a copy button 324, and a find button 325. Note that other buttons (such as a print button) do not appear, because they are not provided by default, or if provided by default, have been deactivated by the hosting program which does not want to offer corresponding functionality. Further note that the document viewing control 204 and/or hosting application program 200 may provide an interface that allows a user to customize the toolbar, e.g., by allowing additional toolbar items to be added, and any existing ones to be removed.

Figure 4:
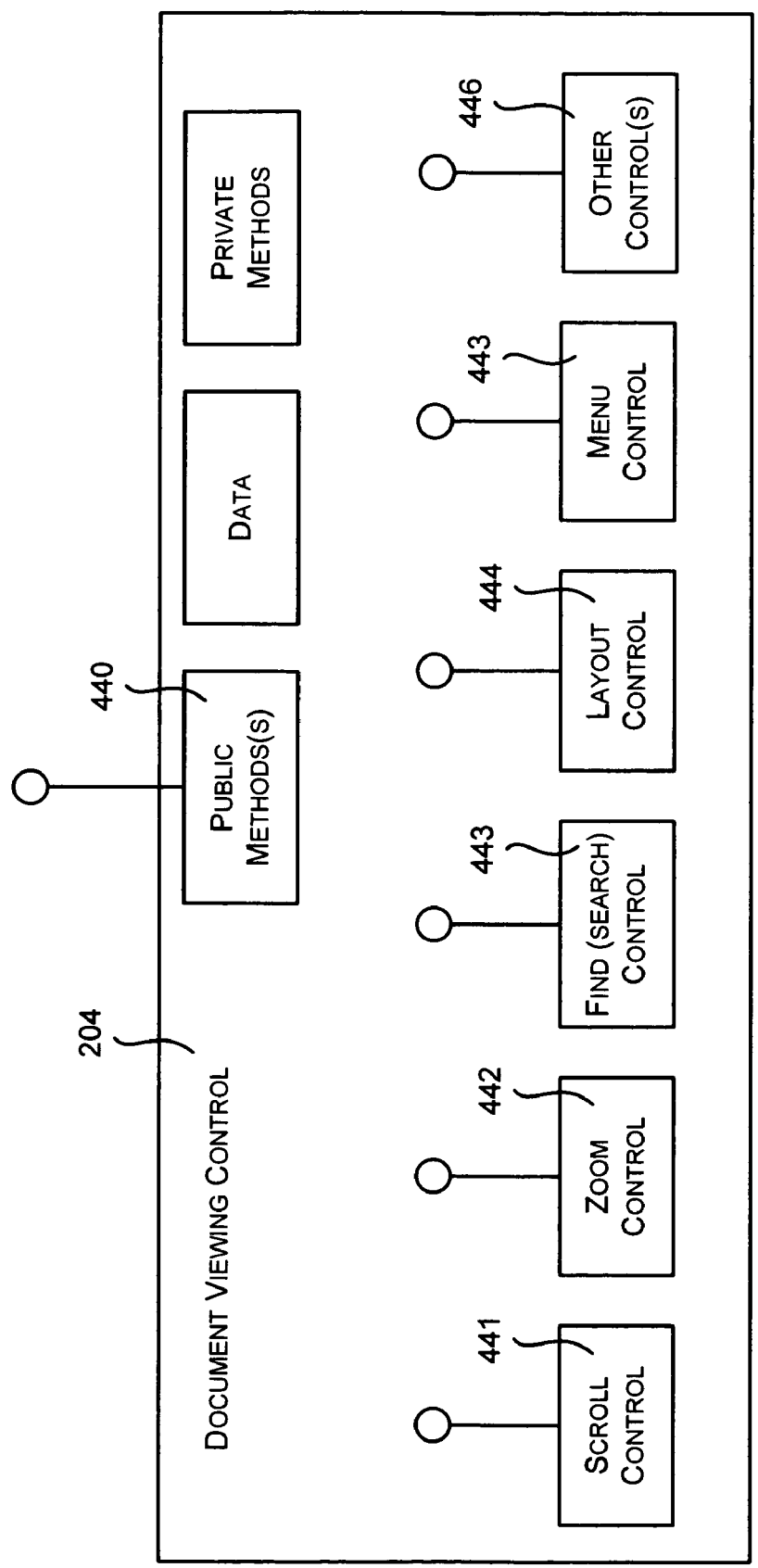
FIG. 4 is a block diagram of a configuration in which an exemplary document viewing control is composed of various other controls, in accordance with various aspects of the present invention.

In one exemplary implementation, generally represented in FIG. 4, the document viewing control 204 comprises an object that when instantiated, hosted and executed may expose several properties and commands via public methods 440. Through the public methods 440, the document viewing control 204 may provide access to its own functions, and also may provide access to other contained controls 441-446 to perform other document viewing functionality. For example, the document viewing control 204 may contain a scroll control 441 to handle scrolling behavior, a zoom control 442 to handle zooming, a find control 443 to search text content for matching text, a layout control 444 that lays out a grid of pages for the user to navigate, and a menu control 445 to handle menu-related functionality such as providing an alternative way for a user to interactively issue commands, including when the toolbar is minimized. Scrolling, zooming and layout are generally described in copending U.S. patent applications entitled "Method and System for Navigating Paginated Content in Page-Based Increments," "Method and System for Zooming in and out of Paginated Content", and "Method and System for Laying Out Paginated Content for Viewing", respectively, each assigned to the assignee of the present invention, filed concurrently herewith, and hereby incorporated by reference. Other controls, (e.g., a control to handle "Copy" operations), may be contained in the document viewing control 204, as represented in FIG. 4 by the block 446. Note that although not specifically shown in FIG. 4, some or all of these controls 441-446, may be publicly exposed on their own.

Returning to the example implementation represented in FIG. 3, the document viewer's toolbar area 212 provides user interface items that expose document viewing controls such as Zoom, Copy and Find. Some of these are tied to commands that the document viewing control 204 natively handles, but some such as Zoom are databound to properties on the document viewing control 204. The toolbar can be minimized and maximized, e.g., through a "ToggleToolbar" Command. When Maximized, the Toolbar comprises a panel with the Toolbar Controls inside of it; in the Minimized state the toolbar is made invisible except for the Menu item.

Each control button in the toolbar is given an identifier and a "Tab" ordering, in order to facilitate accessibility and testing. In an example left-to-right ordering, the first user interface element in the toolbar is the Menu button, which when minimized exposes the same set of commands as normally available in the maximized Toolbar. These menu items (and their associated Commands) may include Copy—ApplicationCommands.Copy, Find—ApplicationCommands.Find, Print—ApplicationCommands.Print, Zoom In—NavigationCommands.IncreaseZoom, Zoom Out—NavigationCommands.DecreaseZoom, Show/Hide Toolbar—document viewing control.ToggleToolbar. The Menu Button may change appearance based on Mouse activity through the use of PropertyTriggers on properties (e.g., IsMouseOver and IsMousePressed) of the Menu Control. Some or all of these commands may be tied to a library of standard commands.

When actuated via clicking or via the Menu, the ZoomOut button causes the document viewing control to zoom out of the current document. Similarly, when actuated, the ZoomIn button causes document viewing control to zoom in on the current document. The Zoom ComboBox contains various predefined "Zoom Stops" and other zoom-related settings (e.g., "100%", "50%", "1 Page", and so forth). The document viewing control's Zoom ComboBox may be implemented in DocumentViewer's Style, databinding DocumentViewer's DocumentLayout property to ComboBox's SelectedItemValue property. Alternatively, developers may just set the number of grid columns directly and/or the zoom percentage using commands or the properties. Each entry in the ComboBox may be a Styled data item of type DocumentLayout, whereby when an item in the ComboBox is selected, the document viewing control's page layout may be updated.

Actuating The Find button invokes the document viewing control's Find dialog. Copy causes a TextEditor (e.g., attached to the document viewing control 204) to copy a user's currently-marked selection to a clipboard, and Print invokes a print dialog.

The content area of the document viewing control, referred to as the viewport 210, displays the content of the document in rows of one or more columns of pages, as laid out in a grid by the layout control. User interface elements in this area may include horizontal and/or vertical scrollbars. A context menu, e.g., which contains the same items as the Menu Button in the toolbar and is attached to the same commands, may also be provided.

Figure 5:
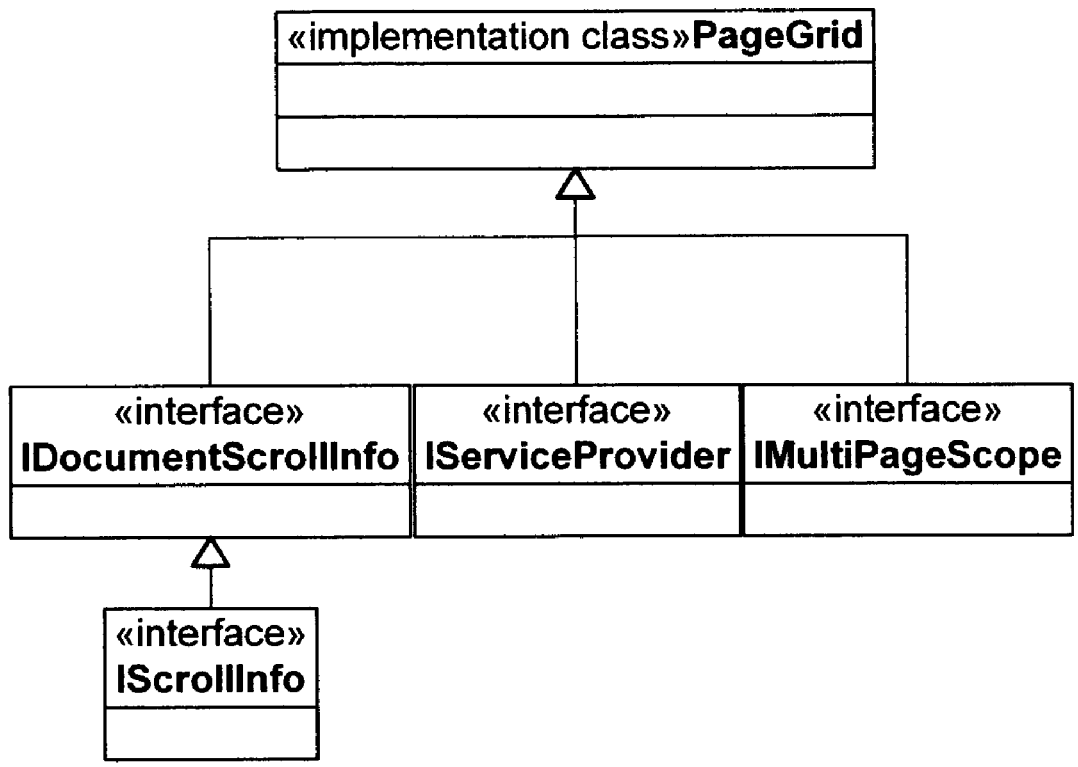
FIG. 5 is a representation of an exemplary layout class for grid layout, including scroll-related interfaces, in accordance with various aspects of the invention.

The document viewing control provides scrolling functionality for the document viewing control's content via the scroll control 441, referred to as the ScrollViewer in one implementation. The layout control 444 (e.g., named DocumentGrid) is the IScrollInfo object used by the document viewing control's ScrollViewer, and is responsible for displaying document content in a flexible manner. Note that DocumentGrid is an internal control, and cannot be directly specified in the document viewing control's Style. As generally represented in FIG. 5, DocumentGrid implements IDocumentScrollInfo (which implements IScrollInfo) and is set up as the child of the ScrollViewer. The ScrollViewer communicates scrolling-based information to DocumentGrid through the IScrollInfo interface; similarly document viewing control will communicate Page-Navigation/Layout based information to DocumentGrid through the IDocumentScrollInfo (or an IDocumentPresentationInfo) interface. The document viewing control will set IDocumentPresentationInfo properties to update DocumentGrid's zoom, offsets, and so forth, and DocumentGrid will call the document viewing control's InvalidatePresentationInfo( ) method in order to keep document viewing control synchronized with properties that have changed on DocumentGrid.

In accordance with various aspects of the present invention, the document viewing control exposed several properties and commands. The table below includes some exemplary properties and commands that may be exposed by one implementation of the document viewing control 204:

```
namespace System.Windows.Controls
{
    public class DocumentViewer : Control, IServiceProvider,
    IAutomationPatternProvider, IAddChild, IEnsureVisible
    {
```

-continued

```
//Public Properties
//Page layout & display controls
public int         PageCount { get; }
public int         FirstVisiblePage { get; set; }
public int         LastVisiblePage { get; }
public double      HorizontalOffset { get; set; }
public double      VerticalOffset { get; set; }
public double      ExtentWidth { get; }
public double      ExtentHeight { get; }
public double      ViewportWidth { get; }
public double      ViewportHeight { get; }
public bool        ShowPageBorders { get; set; }
public double      ZoomPercentage { get; set; }
public int         GridColumnCount { get; set; }
public double      VerticalPageSpacing { get; set; }
public double      HorizontalPageSpacing { get; set; }
//The document content
public IDocumentPaginator    Content { get; set; }
//Useful flags (for Styling purposes)
public bool        IsAtStart { get; }
public bool        IsAtEnd { get; }
public bool        CanZoomIn { get; }
public bool        CanZoomOut { get; }
public bool        IsToolbarMaximized { get; set; }
//Attached Dependency Property for Styling requirements
public DependencyProperty    ContentHostProperty;
//Public Commands exposed by DocumentViewer (i.e. not in
// CommandLibrary) Toolbar
public Command     ToggleToolbar;
//Layout related
Public Command     FitToGridColumnCount;
public Command     ReflowDocument;
public Command     ViewThumbnails;
public Command     ViewFitToWidth;
public Command     ViewFitToHeight;
    }
}
```

The properties and commands of the document viewing control 204 may be accessed by the application 200. Properties that indicate "get" are readable. Properties that indicate "get" and "set" are both readable and writable. It may be readily recognized that other properties and commands may be included and/or that some of the properties and commands above may be deleted or modified without departing from the spirit or scope of the present invention. Furthermore, the above-described properties and commands are exemplary, and it may be readily recognized that other data structures, definitions, techniques, and methods may be used to implement various aspects of the document viewing control 204 without departing from the spirit or scope of the present invention.

The following provides additional details about the properties and commands:

public int PageCount {get;}

PageCount returns the current number of pages loaded into the document viewing control (DocumentViewer). This number will increase until pagination is complete, at which point it will indicate the total number of pages in the document.

public int FirstVisiblePage {get; set;}

When queried, FirstVisiblePage returns the first page visible onscreen. This is either the Top-Leftmost visible page for Left-To-Right content or the Top-Rightmost for Right-to-Left. When set, the document viewing control calls IDocumentPresentationInfo.MakePageVisible( ), which attempts to make the specified page the Top-Leftmost (or Rightmost) page visible where possible. This is not always possible (for example at the top or bottom of the document or for layouts of more than one column), so there may be circumstances where the value assigned to FirstVisiblePage will not be the same as the value read back.

FirstVisiblePage is 1-indexed so as to make databinding to the user interface more useful. Values less than one, or greater than PageCount, will cause the value to be clipped into range. Setting FirstVisiblePage will cause LastVisiblePage to be updated.

public int LastVisiblePage {get;}

When queried, LastVisiblePage returns the last page visible onscreen. This is either the Bottom-Rightmost visible page for Left-To-Right content, or the Bottom Leftmost for Right-to-Left. LastVisiblePage is 1-indexed so as to make databinding to the user interface more useful. Values less than one, or greater than PageCount, will cause the value to be clipped into range.

public double HorizontalOffset {get; set;}

HorizontalOffset indicates the current Horizontal position in the document in pixel units given the current page layout. HorizontalOffset is 0-indexed; values less than zero, or greater than ExtentWidth, may be clipped into range.

public double VerticalOffset {get; set;}

VerticalOffset indicates the current Vertical position in the document in pixel units given the current page layout. VerticalOffset is 0-indexed; values less than zero, or greater than ExtentHeight, may be clipped into range.

public double ExtentWidth {get;}

ExtentWidth indicates the current width of the document layout.

public double ExtentHeight {get;}

ExtentHeight indicates the current height of the document layout.

public double ViewportWidth {get;}

ViewportWidth indicates the current width of DocumentViewer's content area (viewport).

public double ViewportHeight {get;}

ViewportHeight indicates the current height of DocumentViewer's content area (viewport).

public bool ShowPageBorders {get; set;}

ShowPageBorders allows developers to enable or disable the "Drop Shadow" around the pages being displayed in the document viewing control.

public double ZoomPercentage {get; set;}

This is a "convenience" property exposed to make databinding to UI a simple task (for example creating a simple TextBox that allows the user to set the Zoom). Returns the effective Zoom percentage based on the last ZoomPercentage setting or page fit invocation. Values less than five percent or greater than one-thousand percent may be clipped into range.

The ZoomPercentage property will also be associated with a TypeConverter that can parse strings with a "%" sign. This way, databound UI (for example, a TextBox) can display ZoomPercentage's value as "100%" and not "100." In addition, it allows the "%" sign to be used in markup, that is: <DocumentViewer ZoomPercentage="100%"/>.

public int GridColumnCount {get; set;}

This is a "convenience" property exposed to make databinding to UI a simple task (for example creating a simple TextBox that allows the user to set the number of displayed Columns of pages displayed). Returns the number of Columns of pages displayed. When set it will cause the specified number of columns to be laid out (but not fit into view.) Values less than 1 or greater than the number of pages in the document may be clipped into range.

public IDocumentPaginator Content {get; set;}

Content exposes the current IDocumentPaginator content tree loaded into the document viewing control through the IAddChild interface and allows for manipulation of content. When Content is added or removed, it is added or removed from document viewing control's LogicalTree. However, this is not the case when the document viewing control is invoked via styling. In that case, nothing is done; the current check for determining if the document viewing control has been invoked via Styling is "if (this.StyledParent==null)".

public bool IsAtStart {get;}

Indicates whether the document viewing control (DocumentViewer) is at the top of the current document. Useful in DocumentViewer Styles to enable/disable navigation buttons using PropertyTriggers.

public bool IsAtEnd {get;}

Indicates whether the document viewing control is at the bottom of the current document. Useful in DocumentViewer Styles to enable/disable navigation buttons using PropertyTriggers.

bool CanZoomIn {get;}

Indicates whether the document viewing control can zoom in any further (i.e. is not currently at the highest "zoom stop"). Used in DocumentViewer Styles to enable/disable zoom buttons using PropertyTriggers.

public bool CanZoomOut {get;}

Indicates whether the document viewing control can zoom out any further (i.e. is not currently at the lowest "zoom stop"). Used in DocumentViewer Styles to enable/disable zoom buttons using PropertyTriggers.

public bool IsToolbarMaximized {get; set;}

Indicates/Sets the current state of the Toolbar—whether it is minimized, maximized, or disabled. Used in DocumentViewer Styles to show/hide the toolbar based on its reported state.

Commands public Command ToggleToolbar

Invoking this Command causes the document viewing control (DocumentViewer) to toggle the "IsToolbarMaximized" property between true and false. This will cause UI changes based on PropertyTriggers in DocumentViewer's Style, should Style authors choose to make use of the IsToolbarMaximized property.

public Command FitToGridColumnCount

This command will cause the current layout of columns (as specified by GridColumnCount) to be fit exactly into the current viewport.

public Command ReflowDocument

This command will cause any reflowable content in the document to be repaginated to fit within the current viewport, while displaying the currently specified column count.

public Command ViewThumbnails

Sets DocumentViewer.DocumentLayout to DocumentLayout(DocumentLayoutType.Thumbnail).

public Command ViewFitToWidth

Sets DocumentViewer.DocumentLayout to DocumentLayout(DocumentLayoutType.FitToWidth).

public Command ViewFitToHeight

Sets DocumentViewer.DocumentLayout to DocumentLayout(DocumentLayoutType.FitToHeight).

External Commands

There are a wide variety of Commands that the document viewing control (DocumentViewer) will handle but not implement itself. Examples include:

ApplicationCommands.Find

Invokes DocumentViewer's Find dialog.

ApplicationCommands.Print

Invokes DocumentViewer's Print dialog.

ComponentCommands.ScrollPageUp/Down

Causes DocumentViewer to scroll by Viewport's up/down.

ComponentCommands.MoveUp/Down

Causes DocumentViewer to scroll by 16 pixels up/down.

ComponentCommands.MoveLeft/Right

Causes DocumentViewer to scroll by 16 pixels left/right.

ComponentCommands.MoveToHome/End

Causes DocumentViewer to move to the Beginning/End of the document.

ComponentCommands.ScrollByLine

Causes DocumentViewer to scroll by the specified number of lines, either up or down.

NavigationCommands.Zoom

Sets DocumentViewer's Zoom to the specified level.

NavigationCommands.IncreaseZoom/DecreaseZoom

Causes DocumentViewer to Zoom In/Out on the content.

NavigationCommands.GotoNextPage/GotoPreviousPage

Causes DocumentViewer to scroll to the next/previous row of pages.

DocumentViewer Interface Implementations

IServiceProvider

The document viewing control's IServiceProvider implementation will expose DocumentGrid's TextView service, to allow access to the underlying text in the document.

IAutomationPatternprovider

The document viewing control's IAutomationPatternProvider interface handles requests for a UIAutomation TextPattern, which allows the Automation system to access the Text content of the displayed document.

IEnsureVisible

IEnsureVisible allows developers to force certain elements in the document to be visible. This may be used to support Hyperlinking and some Accessibility functionality.

IAddChild

IAddChild allows adding document content to the document viewing control's logical tree. Only one child may be added, and it must be a non-null IDocumentPaginator. If these criteria are not met an exception may be thrown.

In one implementation, in which user interface elements are displayed via interpreted markup, the document viewing control 204 is automatically provided by default as the document viewer whenever one is needed to display content. However, significant flexibility is provided to allow a program to override the default document viewing control 204 with its own customized document viewing control. As can be seen from the API above, this results from the ability to set many of the API's properties.

The document view control may be styled, so that the document viewer's characteristics need only be specified once to make document viewer appear as desired. By way of example, consider the following markup (where DV represents the DocumentViewer):

```
<App>
    <App.Resources>
        . . . DV.Background=Yellow
    </App.Resources>
    <DV>
    </DV>
</App>
```

In general, if any change from the default is desired, the program developer only need specify that a document viewer is a desired program resource, and indicate the desired change or changes. The above markup results in a (mostly) default document viewer having a yellow background; buttons, hyperlinks and so on may be similarly changed. Note that in one implementation, the content and layout may not be styled, and that a valid document viewing control Style needs to contain a ScrollViewer control, marked with the document viewing control.ContentHost attached property. When the document viewing control detects that a Style has been applied, it will walk a visual tree and search for this marked element. If it fails to find one, or if the marked element is not a ScrollViewer, it will throw an exception. If a proper Scroll-Viewer is found, the document viewing control will instantiate a DocumentGrid control (for layout), make it the Content of the ScrollViewer, and enable the DocumentGrid control to talk to ScrollViewer.

Thus, a style property is available to make the document viewer appear as desired by the user. An application program can simply describe what features it wants via a style, and a document viewer with that style appears as specified. Note that the content is not styled, however. The style may specify features such as whether to support zooming in and zooming out at some level, a number of columns of pages to show, and so forth. Even though the API provides the ability to do so, a given program may not use every available feature. Thus, for example, a styled document viewing control may be used in a program to offer limited features to focus users to a customized document viewer, e.g., a single page with Back and Next buttons may be shown, without zooming options.

Further note that styles may be named. Thus, for example, a program may define different styles of document viewers, and then vary which style is used at appropriate times, e.g., by specifying at one time in the program that one document viewer style equals "XYZ" document viewer, and another time that the document viewer to use equals "ABCD" document viewer, and so on. For example, the program may change the document viewer in use with the type of content being displayed, e.g., fixed content has one document viewer style, while reflowable content that adjusts (e.g., text wraps) based on the space available may be shown via a differently-styled viewer.

As can be seen from the foregoing detailed description, there is provided a method and system that allow programs to provide document viewing functionality and features in a manner that is consistent and robust across programs. The method and system are customizable and extensible.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method for enabling a host program to display document content through an object comprising content control and display functionality, the method comprising:
   providing an object to a host program, the host program enabled to host the object;
      the object comprising a plurality of public methods for providing document content control and display functionality, the public methods comprising:
         PageCount, FirstVisiblePage, LastVisiblePage, HorizontalOffset, ExtentWidth, ExtentHeight, ViewportWidth, ViewportHeight, ShowPageBorders, ZoomPercentage, GridColumnCount, VerticalPageSpacing, HorizontalPageSpacing, ToggleToolbar, ReflowDocument, ViewThumbnails, ViewFitToWidth, and ViewFitToHeight;
      the object comprising flags for styling purposes, the flags comprising:
         IsAtStart, IsAtEnd, CanZoomIn, CanZoomOut, and IsToolbarMaximized;
      the object providing an application programming interface (API), and a document content class;
      the document content class being enabled to receive and to contain document content;
      the API providing an interface for host programs to control the display of document content through the object;
   receiving, by the object, a call from the host program through the API;
   the host program adding content to the object using a set method of the content class;
   the object providing a default user interface comprising a toolbar and a viewport; and
   the object displaying document content within the object viewport, the viewport and the toolbar being displayed within a viewing area of the host program.

2. The method of claim 1 wherein displaying document content comprises changing a zoom level of displayed content.

3. The method of claim 1 wherein displaying document content comprises scrolling in the document to change the way content is being displayed.

4. The method of claim 1 wherein providing document content control and display functionality comprises copying selected content in the document.

5. The method of claim 1 further comprising providing document printing functionality in response to a function call.

6. The method of claim 1 wherein the receiving the call from the host program through the API comprises receiving a request to obtain a property value.

7. The method of claim 6 wherein receiving the request to obtain a property value comprises receiving a request for a value of at least one property of a set, the set containing content-related data, page count data, first visible page data, last visible page data, horizontal offset data, vertical offset data, extent width data, extent height data, viewport width data, viewport height data, data indicative of whether page borders are shown, zoom percentage data, grid column count data, vertical page spacing data, horizontal page spacing data, data indicative of whether at document start, data indicative of whether at document end, data indicative of whether the document can be zoomed in, data indicative of whether the document can be zoomed out, and data indicative of a toolbar state.

8. The method of claim 1 wherein receiving the call from the host program through the API comprises receiving a request to change a property value.

9. The method of claim 8 wherein receiving the request to change a property value comprises receiving a request to change a value of at least one property of a set, the set containing content-related data, first visible page data, horizontal offset data, vertical offset data, show page borders data, zoom percentage data, grid column count data, vertical page spacing data, horizontal page spacing data and data to change a toolbar state.

10. The method of claim 1 wherein receiving the call from the host program through the API comprises receiving a command.

11. The method of claim 10 wherein receiving the command comprises receiving at least one command of a set, the set containing a toggle toolbar command, a fit to grid column count command, a reflow document command, a view thumbnails command, a view fit to width command, and a view fit to height command.

12. The method of claim 1 wherein the functionality of the object is customizable by overriding defaults.

13. On a computer-readable storage medium, a computer program product having computer instructions recorded thereon, which when executed within a computing system, implement the method as recited in claim 1.

14. The computer program product of claim 13 wherein the host program customizes the object by overriding at least one default feature.

15. The computer program product of claim 14 wherein the host program customizes at least part of the document viewing control via a style.

16. The computer program product of claim 13 wherein the object contains a control set of at least one other control related to displaying content of a document.

17. The computer program product of claim 16 wherein the control set includes a scroll-related control, a zoom-related control, a find-related control, a layout-related control, a menu-related control, and a copy-related control.

18. The computer program product of claim 13 wherein the API provides access to properties and a command set;

the properties including each property of a property set containing:

content-related data, page count data, first visible page data, last visible page data, horizontal offset data, vertical offset data, extent width data, extent height data, viewport width data, viewport height data, data indicative of whether page borders are shown, zoom percentage data, grid column count data, vertical page spacing data, horizontal page spacing data, data indicative of whether at document start, data indicative of whether at document end, data indicative of whether the document can be zoomed in, data indicative of whether the document can be zoomed out, and data indicative of a toolbar state; and the command set including each of:

a toggle toolbar command, a fit to grid column count command, a reflow document command, a view thumbnails command, a view fit to width command, or a view fit to height command.

19. In a computing environment, a system comprising one or more computer processors and system memory storing computer-executable instructions which, when executed by the one or more processors, perform the method recited in claim 1.

20. The system of claim 19 wherein user interaction changes the way content is displayed.

* * * * *